(12) United States Patent
Hall (10) Patent No.: US 11,332,208 B2
(45) Date of Patent: May 17, 2022

(54) DEVICE FOR REMOVING, STORING AND INSTALLING CONVERTIBLE SUV HARDTOPS FROM THE REAR OR SIDE

(71) Applicant: Frederick Hall, Melbourne, FL (US)

(72) Inventor: Frederick Hall, Melbourne, FL (US)

(73) Assignee: Norge Holdings, LLC, Melbourne, FL (US)

( * ) Notice: Subject to any disclaimer, the term of this patent is extended or adjusted under 35 U.S.C. 154(b) by 0 days.

(21) Appl. No.: 17/245,696

(22) Filed: Apr. 30, 2021

(65) Prior Publication Data
US 2022/0111918 A1    Apr. 14, 2022

Related U.S. Application Data

(60) Provisional application No. 63/090,769, filed on Oct. 13, 2020.

(51) Int. Cl.
| | |
|---|---|
| *B62D 65/02* | (2006.01) |
| *B66F 19/00* | (2006.01) |
| *B25H 1/00* | (2006.01) |
| *B66F 11/00* | (2006.01) |
| *B66C 23/48* | (2006.01) |

(52) U.S. Cl.
CPC .......... *B62D 65/022* (2013.01); *B25H 1/0007* (2013.01); *B66C 23/48* (2013.01); *B66C 23/485* (2013.01); *B66F 11/00* (2013.01); *B66F 19/00* (2013.01)

(58) Field of Classification Search
CPC .. B62D 65/022; B25H 1/0007; B66C 23/485; B66C 23/48; B66F 11/00; B66F 19/00
See application file for complete search history.

(56) References Cited

U.S. PATENT DOCUMENTS

| | | | | |
|---|---|---|---|---|
| 5,322,403 | A * | 6/1994 | Herde | E04F 21/1822 248/354.1 |
| 6,024,348 | A * | 2/2000 | Ventura | B05B 13/0285 269/104 |
| 8,028,702 | B2 * | 10/2011 | DaSilva | A61G 13/12 128/845 |
| 2007/0289506 | A1 * | 12/2007 | Branch | A47B 23/046 108/116 |
| 2013/0264531 | A1 * | 10/2013 | Stewart | E04F 21/18 254/133 R |

OTHER PUBLICATIONS

U.S. Appl. No. 16/172,736, filed Oct. 27, 2018, Hall.
U.S. Appl. No. 16/953,732, filed Feb. 28, 2021, Hall.

* cited by examiner

*Primary Examiner* — Tyrone V Hall, Jr.
(74) *Attorney, Agent, or Firm* — William Gray Mitchell (57) ABSTRACT

A device designed for the removal, storage, and installation of removable hardtops from convertible sport utility vehicles, either from the rear or side, comprising a wheeled base unit, a vertical support structure and a top clamping assembly, wherein the base unit is aligned below the top frame and the vertical support structure connects them together, wherein the device can be disassembled for simple shipping, is adjustable for height and depth to accommodate different SUV models, and includes markers for easy assembly.

14 Claims, 12 Drawing Sheets

DEVICE FOR REMOVING, STORING AND INSTALLING CONVERTIBLE SUV HARDTOPS FROM THE REAR OR SIDE

CROSS REFERENCE TO RELATED APPLICATIONS

This application claims priority to provisional U.S. application 63/090,769, filed Oct. 13, 2020.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is a device for the removal, storage and installation of convertible sport utility vehicle (SUV) hardtops.

Background of the Invention

Convertible two door and four door SUVs are typically sold with collapsible soft tops standard on these vehicles. For many individuals, these convertible soft tops do not provide adequate weather or noise insulation. Additionally, it can be a difficult task to collapse and erect the soft tops on the vehicle, particularly on the 4-door vehicles.

Various types of removable hardtops have been made available and configured to replace the standard collapsible soft tops for the different convertible SUVs. These convertible hardtops provide significantly better weather and noise insulation than their soft top counterparts. However, in order to enjoy the convertible feature of an SUV it is often desirable to remove the hardtop.

A SUV removable hardtop is typically configured to be easily attachable and detachable to the SUV. Typical SUV removable hardtops are relatively heavy, bulky, and awkward to handle. The size and weight present a significant problem for removal and installation, especially by one person working alone. Typically, a group of at least two people is required to remove or install SUV removable hardtops. In order to further share the weight load, a group of four people is preferable to lift and remove or install a removable hardtop, with each person handling or lifting each corner of the hardtop in concert with others in the group.

In order to simplify the process of installing and removing hardtops from the convertible SUVs, many owners will utilize specialized overhead lifts that are installed in their garages to perform this function. When utilizing these overhead lifts, owners will position their vehicle below the stationary lifts, and then connect the hardtop to the overhead lift, release the hardtop from the SUV, lift the hardtop above the SUV, and then drive the vehicle from underneath the lift and detached hardtop. Similarly, when installing the hardtop the vehicle will be positioned under the lift and hardtop, which will be then lowered onto the SUV.

While these lifts are an effective method of removing and installing convertible hardtops on an SUV, they can provide logistical issues. First and foremost, utilization of a hoist-style lift as described above requires the owner of the vehicle to have a garage or other support structure available onto which the hoist system can be installed. Not all owners of these types of vehicles have these facilities available to them. Additionally, these types of lifts are fixed and not portable. Therefore, they may not be suitable for owners of these types of vehicles who may rent or who want to have the ability to remove the top from their vehicle at locations other than their home, such as when they are on vacation or a camping trip. The fixed nature of such systems can also result in difficulties reinstalling the hardtop after removal, as the vehicle must be precisely positioned for proper reinstallation. Finally, most of these fixed position lift devices do not allow for parking vehicle in the garage while hardtop is affixed to the device.

Variations of a freestanding device capable of installing and removing a hardtop from a convertible SUV as well as compactly storing such hardtop while disengaged from the vehicle are known from U.S. Pat. No. 9,643,823 and U.S. patent application Ser. No. 16/172,736, each to Applicant, Federick Hall. The Hall documents teach a movable device allowing a single user to remove, store and reinstall a SUV hardtop, with a vertical lifting means for raising and lowering such hardtop while disengaged from the SUV.

A new model of SUV, the Jeep Gladiator®, has now been introduced, and adds the new wrinkle of a truck bed, making removal from the rear with known removal devices impossible. What is needed is a device that can remove hardtops from the side or front of a vehicle instead of or in addition to the rear.

DETAILED DESCRIPTION OF THE INVENTION

As is known from prior art U.S. Pat. No. 9,643,823 and U.S. patent application Ser. No. 16/172,736, FIG. 1 shows a previous design for a device designed for the removal, storage, and installation of removable hardtops 1 (not pictured) from convertible sport utility vehicles 2 (not pictured).

Figure 1:
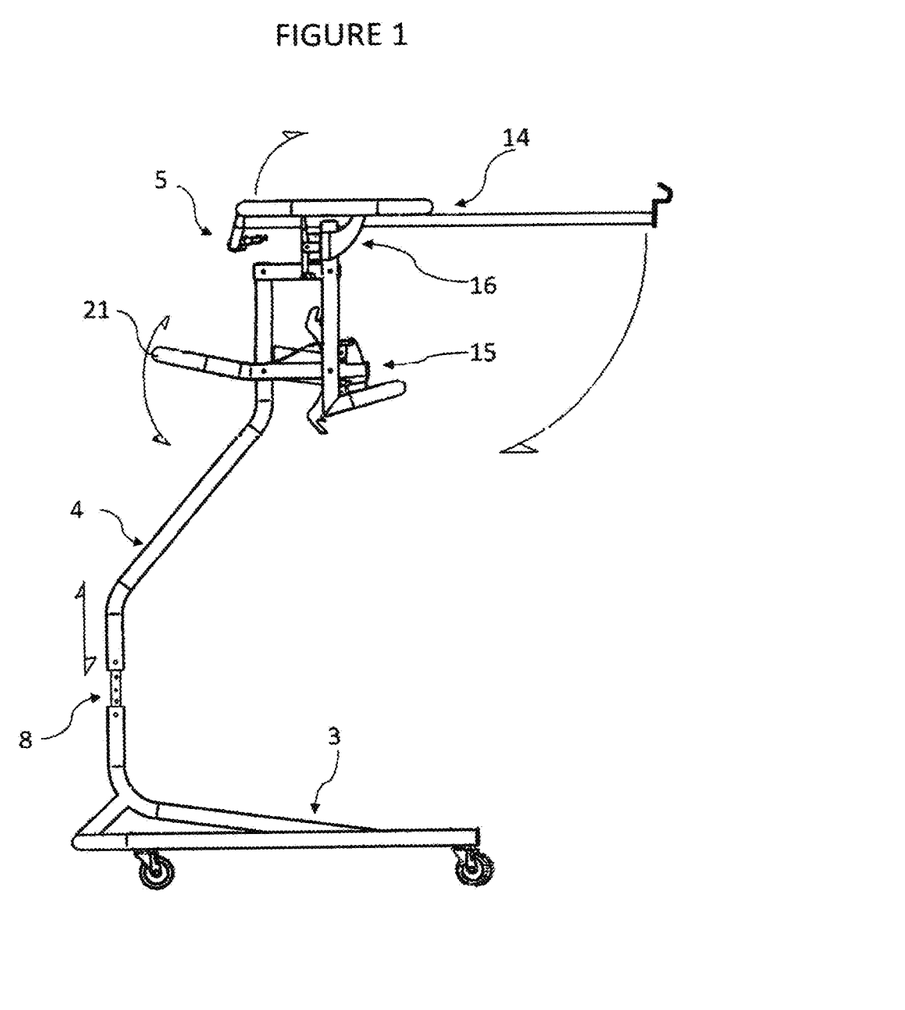
FIG. 1 is a side elevation view illustrating a sport utility vehicle hardtop removal device of prior art.

As depicted in FIG. 1, in general the device comprises a wheeled base unit 3, a vertical support structure 4 and a top platform assembly 5, wherein each such component is embodied as an interlocking tubular construction. The core components of the device are arranged such that the base unit 3 is aligned directly below the top frame 5 and the vertical support structure 4 is connected to the rear of the base unit 3 and platform assembly 5 connecting the two together. The resulting structure is a "C" shaped unit, which is designed such that the weight and moment created when the hardtop unit 1 is loaded onto the platform assembly 5 its weight is counteracted and supported by the legs 6 of the base unit 3, preventing the device from toppling over.

Referring again to Prior Art, FIG. 2 shows the base unit 3 is comprised of a "U" shaped frame 9 with two legs 6 with four casters 3 affixed to the legs 6. The frame 9 of the base unit 3 connects to the vertical support 4 structure near the rear of the base frame 9. In the preferred embodiment the frame and the vertical support structure are tube in tube slide-over connections 8 with a plurality of aligning holes 12, through which pins can be inserted (not pictured) to allow for simple height adjustment, however, these two units could be affixed to each other in any manner known to those skilled in the art, such as brackets and welding.

Figure 2:
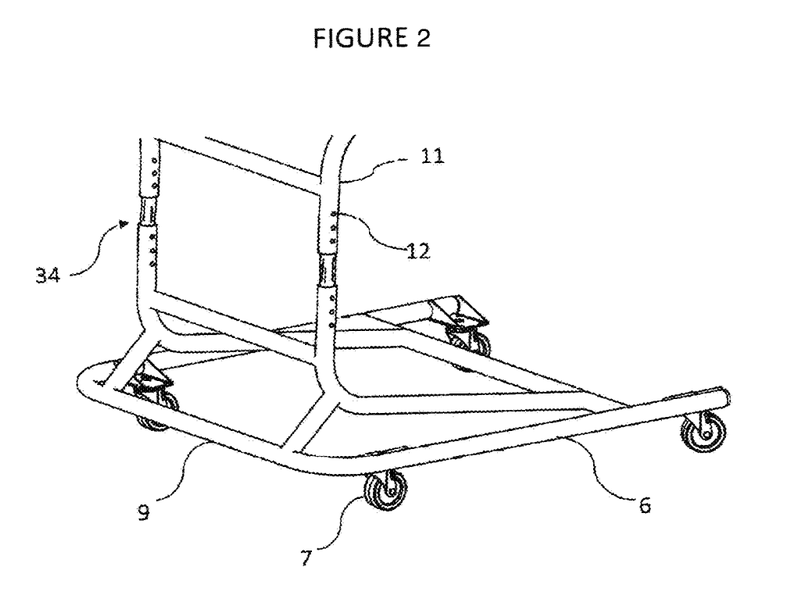
FIG. 2 is a perspective view of the base of the prior art device of FIG. 1.

The most critical design aspect of the base unit is that the horizontal distance between the end of the base legs 6 and the vertical support 4 be sufficient to prevent the unit from toppling over when the hardtop 1 is installed on the platform assembly 5. The ends of the base legs 6 should extend from the vertical support 4 to at least the horizontal location of center of mass of the unit, both with the hardtop installed and the hardtop removed and ideally a bit past the center of mass for added stability.

Additionally, the lateral distance between the two legs 6 needs to be sufficient to provide lateral support and prevent the unit from tipping over sideways, however, the distance cannot exceed the distance between the inner side of the tires of the SUV 10. Exceeding the distance between the inner sides of the tires 10 would prevent the legs 6 of the unit from being able to roll underneath SUV 2 so that the platform assembly 5 can align with the removable hardtop 1.

Attached to the underside of the legs 6 are four wheel and caster assemblies 7. These wheel and caster assemblies 7 allow the device to be aligned with the hardtop 1 and roll away from the hardtop 1 once it has been detached from the SUV 2. In the preferred embodiment of the invention, the casters 7 are all free rotating, however, the casters 7 could be all fixed, a combination of fixed and free rotating casters 7, or any other arrangement known to those skilled in the art.

In the prior art design of FIGS. 1 and 2, a vertical support structure 4 connects the base unit 3 and the platform assembly 5 is. The vertical support structure 4 comprises a single, or a plurality of vertical beams 11. In the preferred embodiment of the invention the vertical support structure 4 is variable in length to allow the device to be utilized with a variety of types of vehicles. In the preferred embodiment the variable height support beams 11 are hollow tube in tube structure 8 with a plurality of pin holes/pins 12 to allow for height adjustment. However, the inventor recognizes that height adjustment can be achieved through a number of methods known to those skilled in the art, such as, but not limited to, hydraulic or pneumatic cylinder and tube in tube structures with spring-loaded and/or push-button retention pins.

Figure 3:
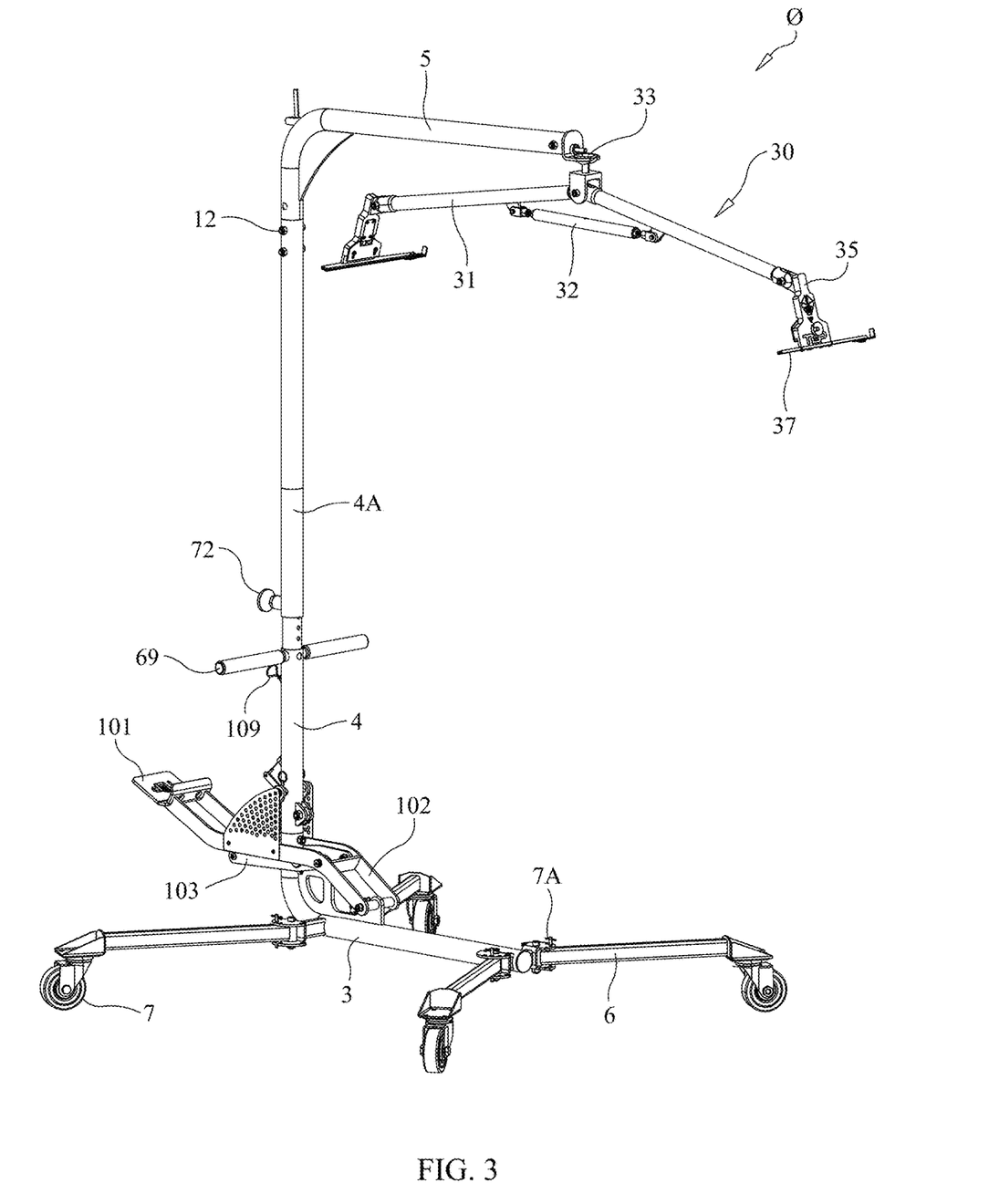
FIG. 3 is a perspective view of a first embodiment of the sport utility vehicle hardtop removal device of the present invention.

FIG. 3 shows a primary embodiment of a hardtop removal device 0, comprising the present invention and specifically intended to allow for removal from the vehicle side and thus to service the Gladiator SUV model. The device comprises major components embodied as interlocking tubing made of metal or a similar rigid material, including a wheeled base unit 3 affixed to and supporting a vertical support structure 4, which support structure is also affixed to a top frame 5. Such top frame comprises a top clamping assembly 30, embodied as additional tubing.

The hinged/pivoting connections 12 used throughout the device in the preferred embodiment are achieved through pins or bolts running through holes that are drilled in the tube frame. However, the inventor recognizes that hinged/pivoting connections 12 can be achieved through a number of methods known to those skilled in the art, such as, but not limited to, template hinges and pivot hinges.

In the design of FIG. 3, the vertical support structure 4 is straight upright instead of angled forward as with the prior art iterations. Given the lack of angling, the base 3 may be longer from front to back than the design of the prior art. A single central top frame 5 tube attaches to and emanates forward from the vertical support structure 4, such top frame then attaching to top clamping assembly 30 via a ball style coupler 33. This coupler allows for a swiveling action whereby the clamping assembly can swivel between a sideways-facing arrangement, allowing for hardtop removal from the vehicle side, and a forward-facing arrangement, whereby an engaged and removed hardtop may be swiveled into a straight-on position for storage. The coupler is also lockable with a safety pin 34 (see FIG. 5).

Figure 6:
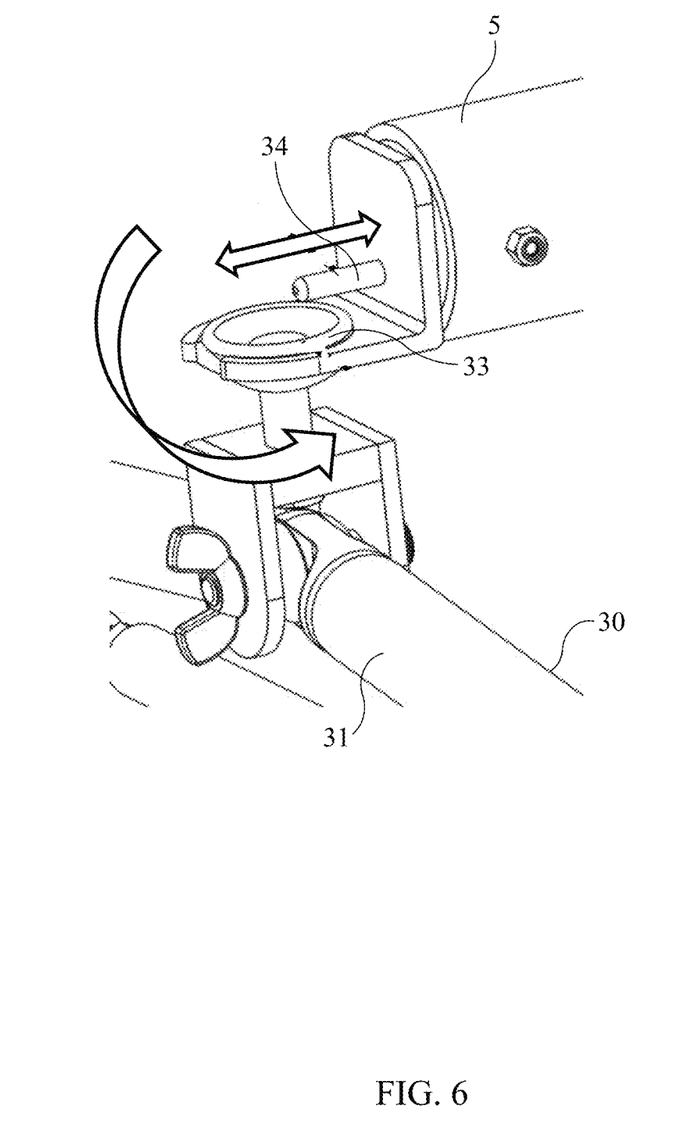
FIG. 6 is a close up view of a ball style coupler attaching a top frame to a top clamping assembly of the device of FIG. 3.

The top clamping assembly 30 comprises two spreader bars 31 emanating outward from the ball style coupler 33, each spreader bar terminating in a clamping member 35 (see FIG. 6). The width of the clamping assembly is determined by adjustment bar 32, located between the pair of spreader bars and adjustable to widen or narrow the breadth of such spreader bars. The adjustment bar is embodied as a bar that slidably widens and narrows with known technology. In one embodiment, the bar comprises two overlapping tubes wherein the inner tube is optionally spring loaded and can be held in place adjustably with snap buttons or pins.

Also unlike the prior art design, FIG. 3 also shows a wheeled base unit 3 comprising a single central tube with four tubes extending laterally therefrom, each comprising a caster 7 on its distal end. All such lateral tubes are adjustable using aligning holes/pins 12, shown as push-button snaps. Each caster assembly 7 is also rotatable around caster joint 7A, which comprises a locking pin.

In lieu of the lifting mechanisms of the prior art, the present invention pictured in FIG. 3 uses pedal lift 100 seated between the wheeled base unit 3 and the vertical support structure 4 to allow a user to lift and lower the assembly over a vehicle and then raise and remove the assembly once the hardtop is secured. In particular, the pedal lift mechanism comprises a pedal 101 to be operated with the user's foot, such pedal attached to the wheeled base unit 3 at pedal lever hinge 108. When pressed, the pedal applies a downward pressure onto pedal lever 102 and thence to a hinged pedal lift arm 26, which extends from a lower lift arm joint 104 with the pedal lever upward to an upper lift arm joint 105 (not pictured) with the vertical support structure. By applying downward pressure on the pedal 101, the pedal lever 102 rotates on the pedal lever hinge 108, forcing the lower lift arm joint downward, straightening the lift arm hinge 106 and thus raising the vertical support structure 4 via the upper lift arm joint 105. Also pictured in its disengaged position is the pedal lift lock 109, embodied as a wire attached to the pedal lift mechanism, running up the vertical support structure and terminating in a metal ring. The pedal lift lock may be engaged with several points of attachment on the vertical support structure, allowing the device to be locked at multiple height levels.

Figure 4:
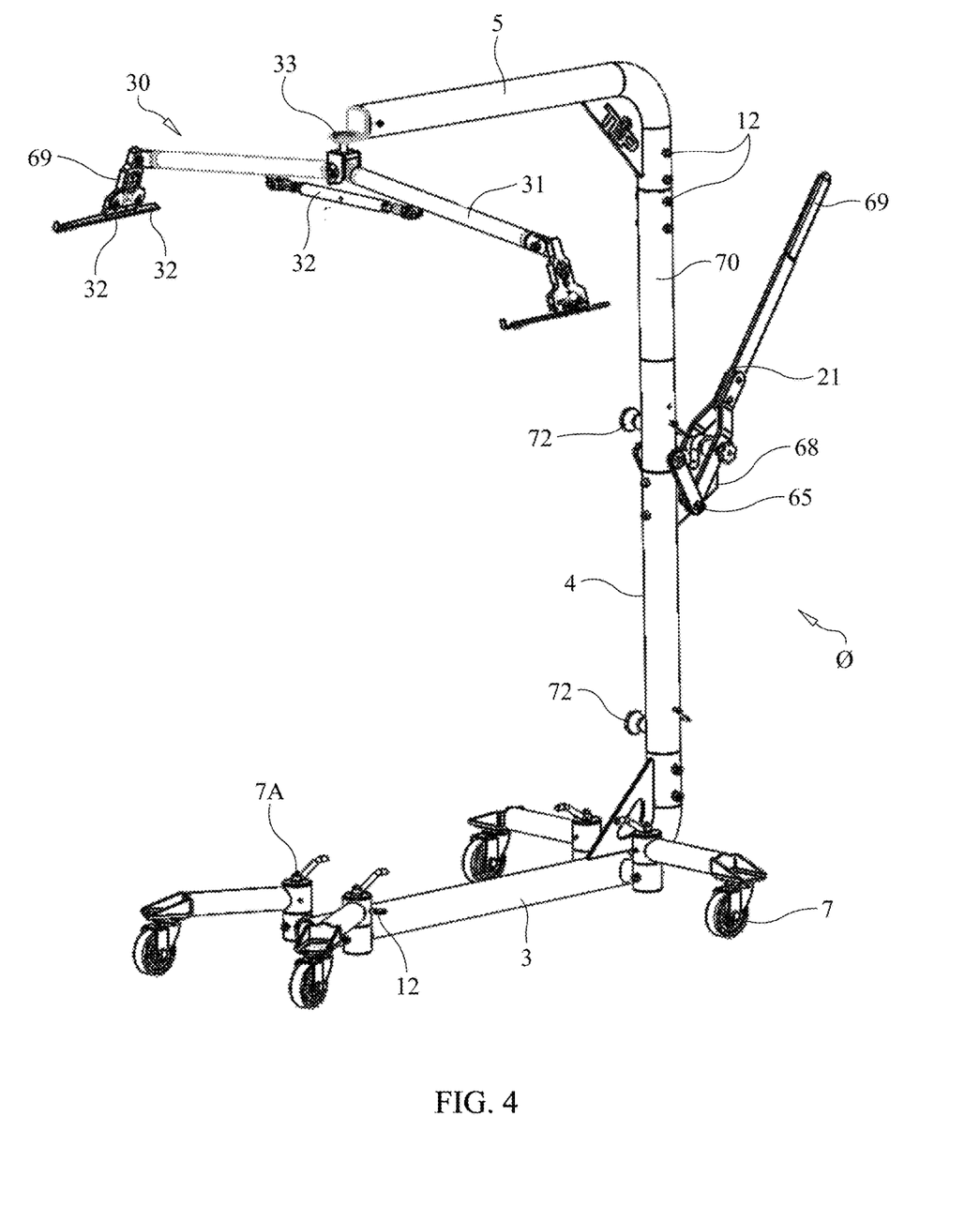
FIG. 4 is a perspective view of an alternate embodiment of the sport utility vehicle hardtop removal device of the present invention.

FIG. 4 shows an alternate embodiment of the hardtop removal device 0 of FIG. 3, again intended to allow for removal from the vehicle side. In the present invention, a single central top frame 5 tube attaches to and emanates forward from the vertical support structure 4, such top frame then attaching to top clamping assembly 30 via a ball style coupler 33. This coupler allows for a swiveling action whereby the clamping assembly can swivel between a sideways-facing arrangement, allowing for hardtop removal from the vehicle side, and a forward-facing arrangement, whereby an engaged and removed hardtop may be swiveled into a straight-on position for storage. The coupler is also lockable with a safety pin 34 (see FIG. 5).

Figure 5:
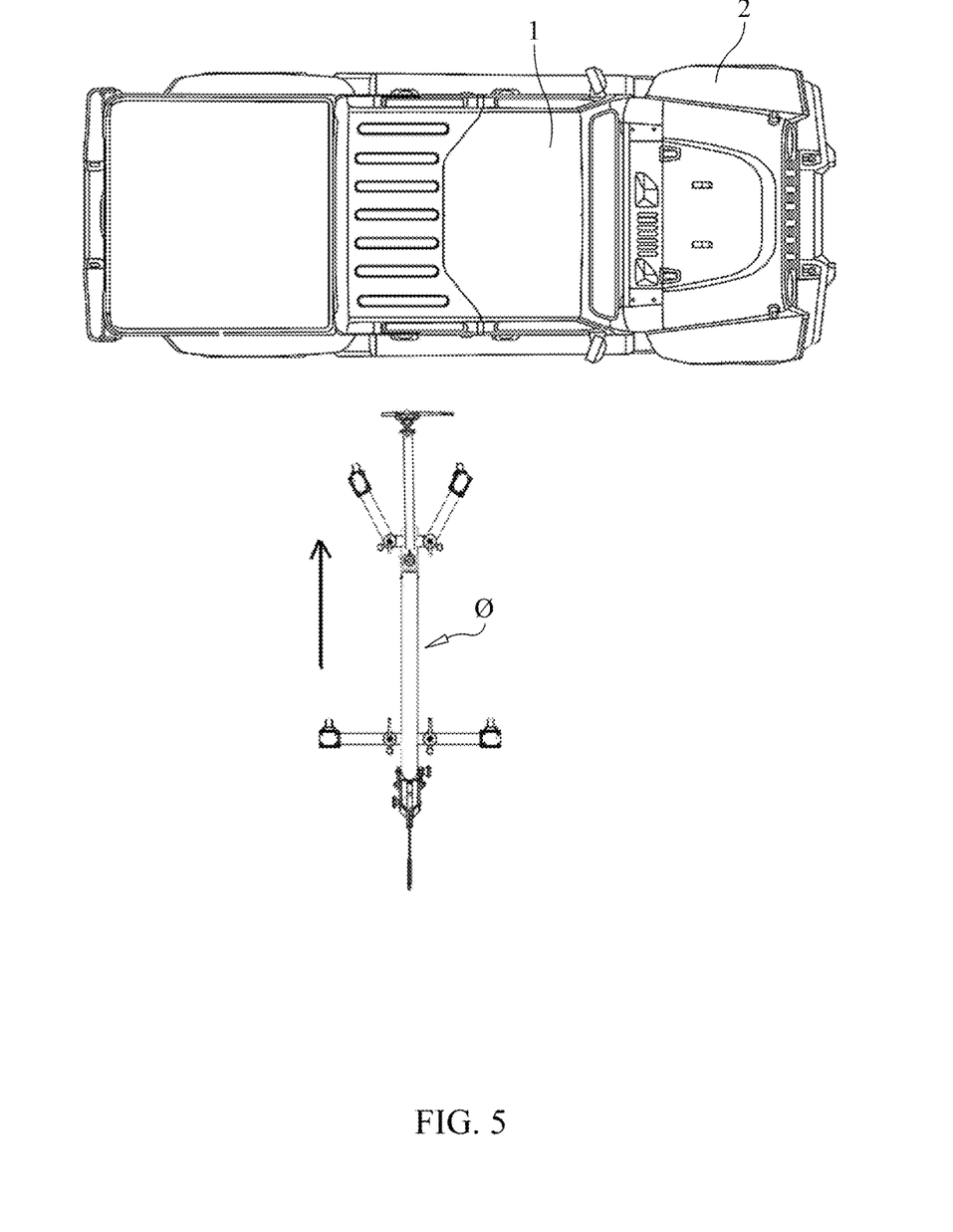
FIG. 5 is an overhead view of the device of FIG. 3 approaching a sport utility vehicle from the side.

FIG. 5 shows a top view of the hardtop removal device 0 being wheeled from the side of SUV 2, embodied as a Gladiator, to engage hardtop 1.

FIG. 6 is a close view of ball style coupler 33 connecting top clamping assembly 30 to top frame 5. The swiveling effect of the coupler is indicated with an arc arrow, while a safety pin 34 is shown to be pushed/pulled to secure or unsecure the coupler to allow or disallow such swiveling. The swivel feature of the ball style coupler allows the user to arrange an engaged hardtop in favored direction for device movement and storage purposes.

Figure 7A:
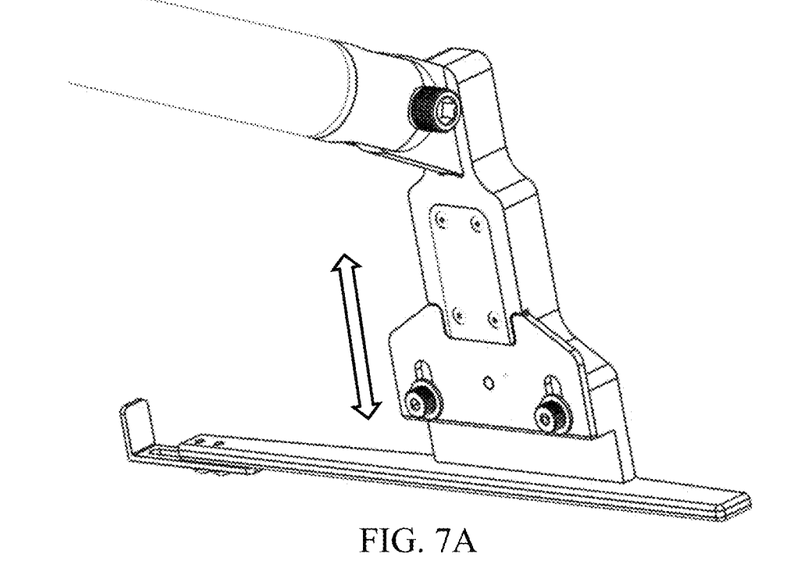
FIG. 7A is a close up view of a roof drip-rail latch in an open position at the end of a spreader bar.
Figure 7B:
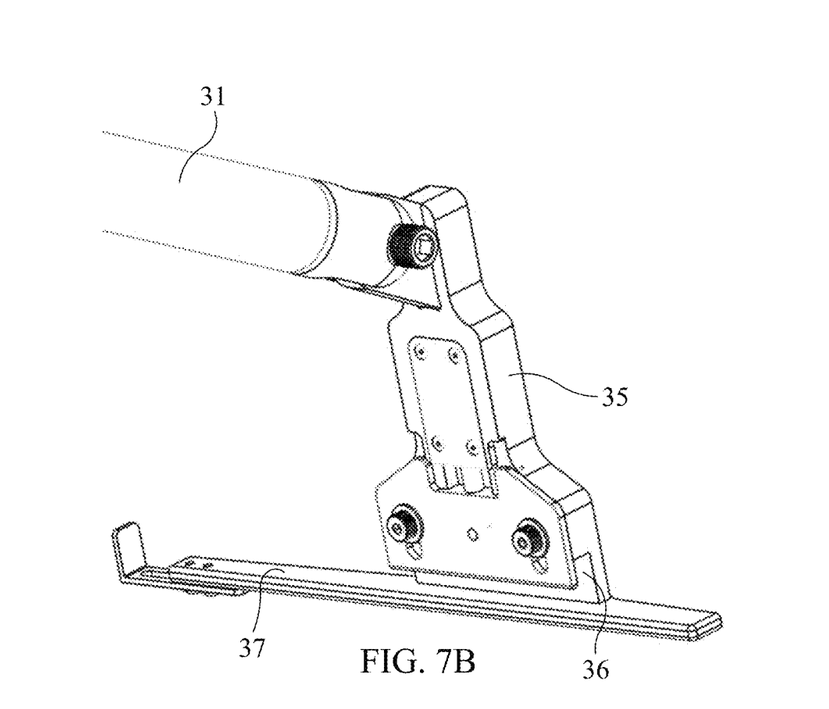
FIG. 7B is a close up view of a roof drip-rail latch in a closed position at the end of a spreader bar.

FIGS. 7A and 7B each comprise a close up view of a clamping member 35 arranged on either side of top clamping assembly 30, at the distal end of each spreader bar 31. Each such clamping member is attached to its spreader bar such that the member extends downward, terminating in an adjustable drip rail latch 36, shown in both the open and closed positions. Each such latch comprises a support shelf 37 on its lower edge, which support shelf is designed to engage with the drip rail 20 running over the window on a hardtop (not pictured), such drip rail acting as a rain gutter. Since drip rails are metal, welded components of hardtops, they serve as durable points of attachment for the clamping members 35.

Figure 8:
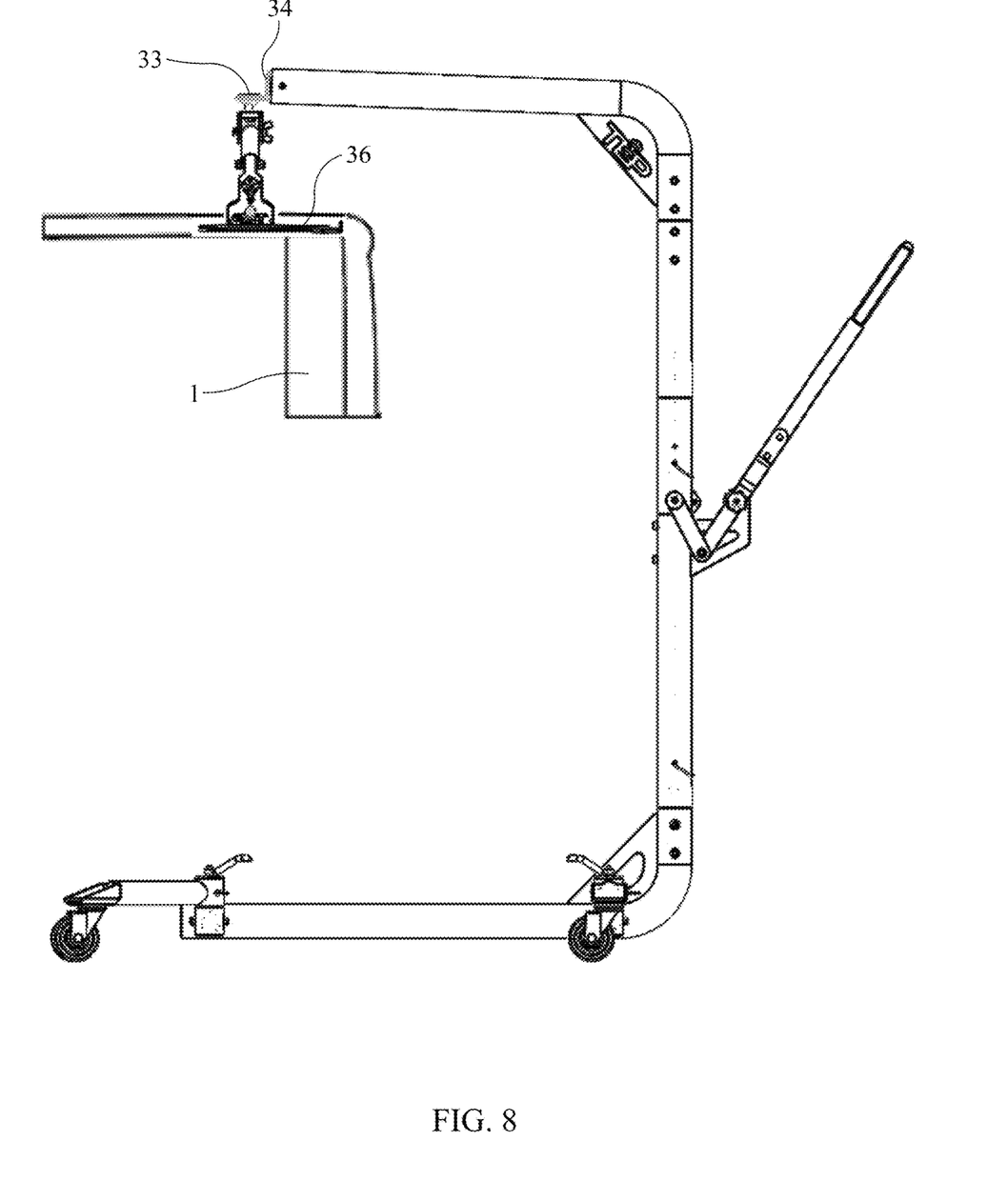
FIG. 8 is a side view of the device of FIG. 4 engaged with a SUV hardtop.

FIG. 8 is a side view of the hardtop removal device 0 engaging a SUV hardtop 1 with drip rail latches 36. In this view, ball style coupler 33 has been turned, thus swiveling the hardtop and securing such coupler with safety pin 34 so that it is facing forward in relation to the device.

Figure 9:
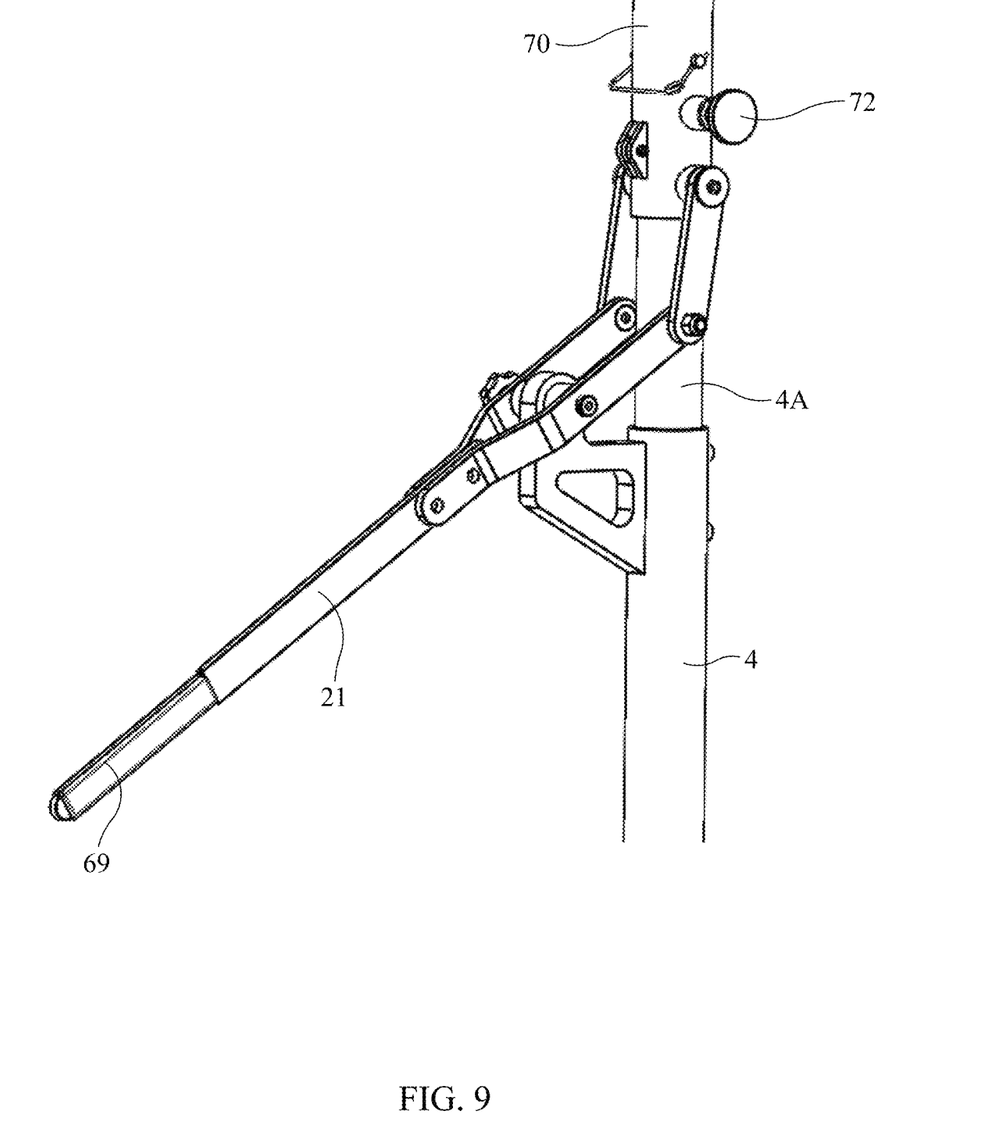
FIG. 9 is a close up view of a lift lever assembly of the device of FIG. 4.

FIG. 9 shows a side view of the central part of the embodiment of FIG. 4 comprising the lift lever 21 in which the handle 69 has been pulled downward and locking hinge 65 is approaching an open, locked position. The downward movement of the handle has leveraged the upper portion 70 upward, thus exposing the central tube 4A of the vertical support structure. Once a desired height is achieved, it can be set using pull stop 72, which matches with any of a plurality of locking pin holes 4B (not pictured) in the underlying central tube. allows for adjustment of elevation prior to lifting. Such desired height may be chosen from a plurality of settings at regular intervals, preferably 1" intervals. This open position will raise the engaged SUV hardtop (not pictured) and allow the entirety of the device with the hardtop to be wheeled away from the vehicle for storage.

Figure 10:
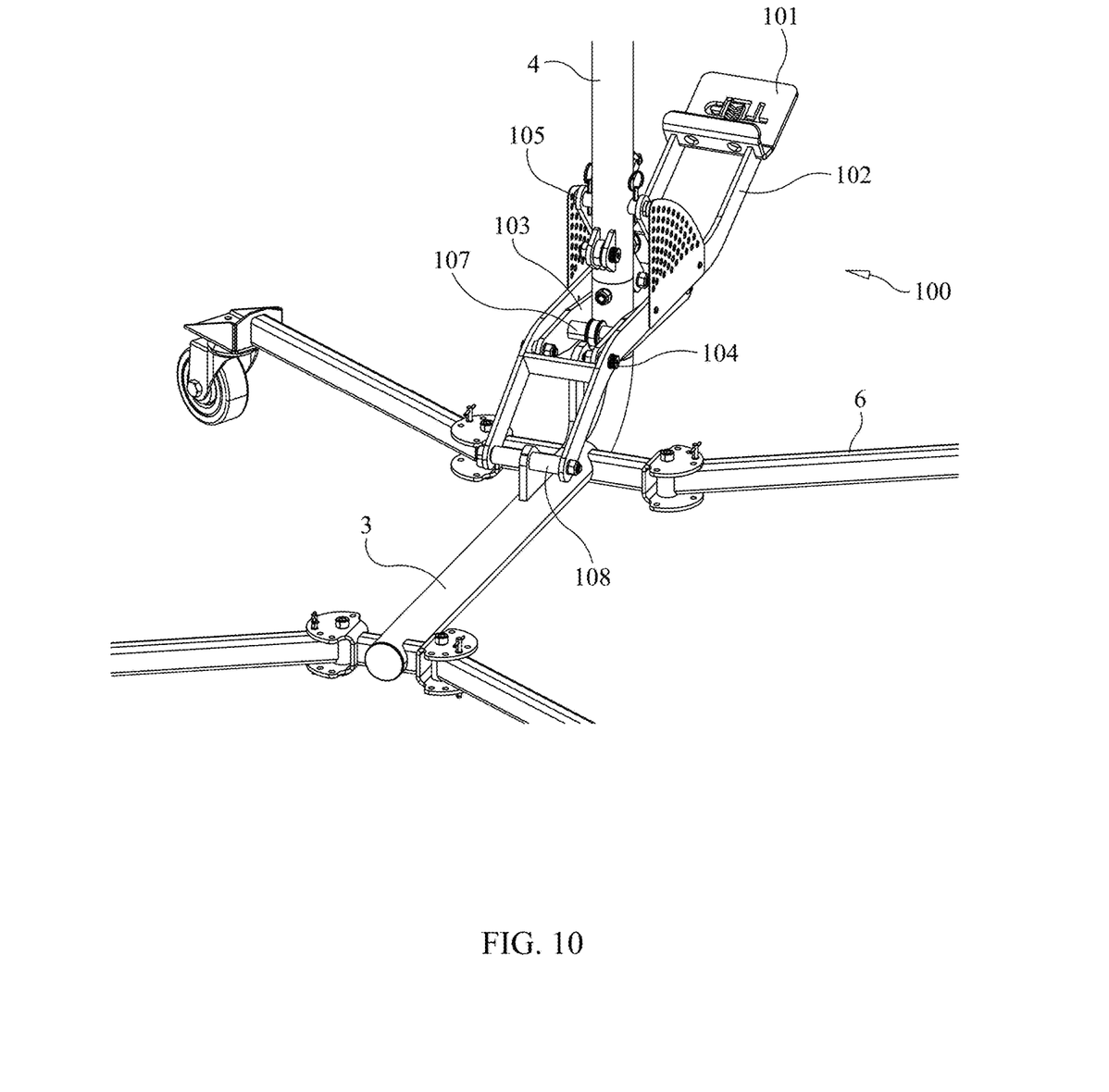
FIG. 10 is a close up view of a pedal lift assembly of the device of FIG. 3 in an undepressed position.

FIG. 10 is a close-up illustration of the pedal lift 100, with the pedal 101 undeployed in its upward position. In this position, no upward thrust has been applied by pedal lever 102 to pedal lift arm 103, which remains folded within the pedal lever. As a result, the vertical support structure 4 remains in its down position, directly in contact with the tubular frame of the wheeled base unit 3.

Figure 11:
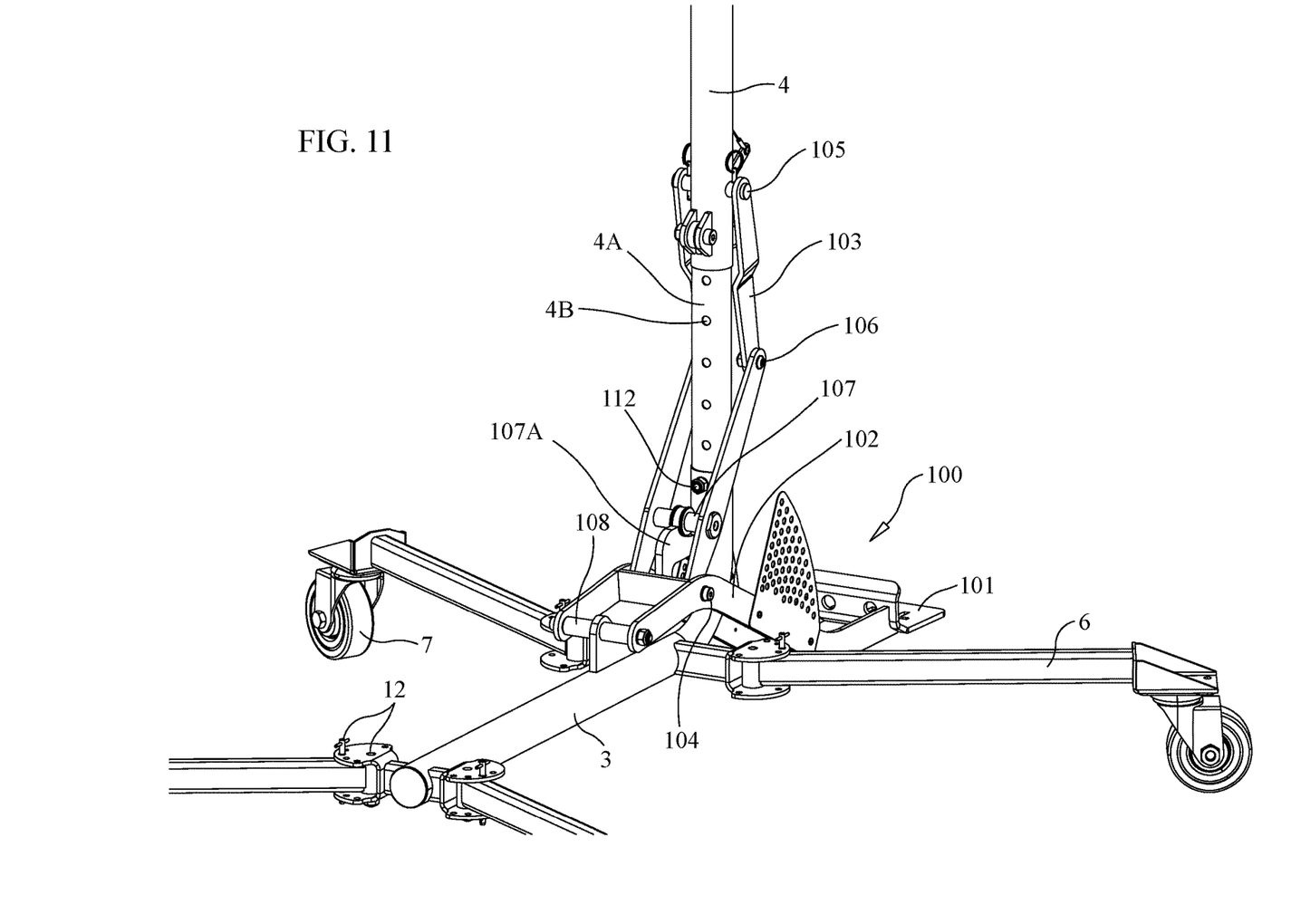
FIG. 11 is a close up view of a pedal lift assembly of the device of FIG. 3 in a depressed position.

FIG. 11 provides a second illustration of pedal lift 100, this time with the pedal 101 depressed, thus rotating the pedal lever 102 on the pedal lever hinge 108, seated on the wheeled base unit 3. The pedal depression forces the lower lift arm joint 104 downward, pulling the attached end of the pedal lift arm 103 downward and rotating the lift arm bolt 107 in the lift arm bolt seat 107A on the wheeled base. This action straightens the lift arm hinge 106, thus elongating the pedal lift arm and raising the vertical support structure 4 via the upper lift arm joint 105. This action exposes the central tube 4A, which comprises a plurality of locking pin holes 4B.

Figure 12:
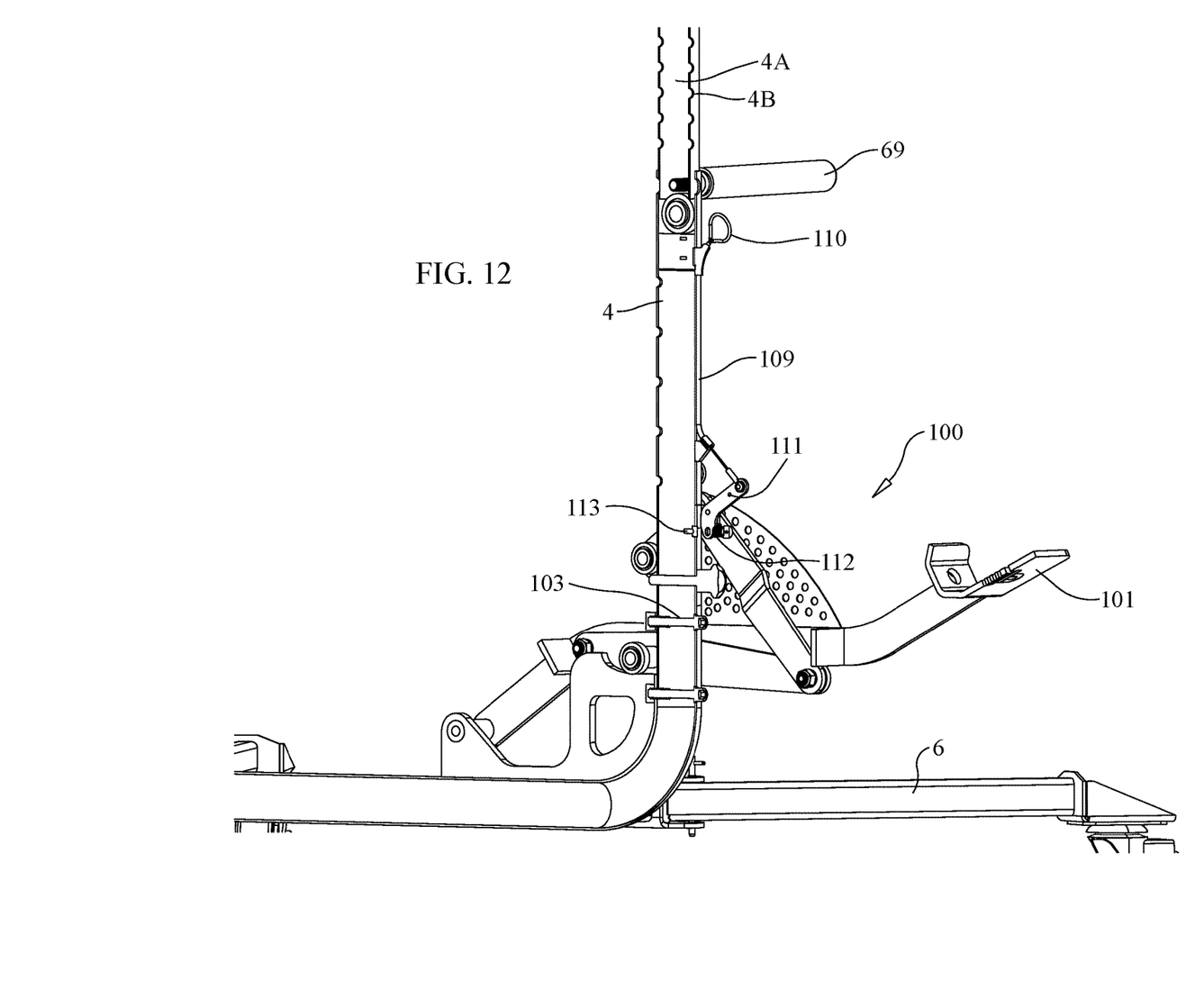
FIG. 12 is a close up view of a pedal lift lock assembly.

FIG. 12 provides a third illustration of pedal lift 100 from an alternate angle, this time evidencing the wire and ring of the pedal lift lock 109 terminating in pedal lift lock ring 110, which is to be engaged with a finger or thumb of the user while the pedal 101 is depressed by the user's foot. By pulling up on pedal lift lock ring 110, the user pulls upward on curved spring plate 111, thereby compressing spring locking spring 112 and withdrawing locking spring pin 113 away from vertical support structure 4 and central tube 4A. To further ease the raising process, the user may engage the lock ring while also holding and applying upward pressure on the handle 69 using one or both hands. The simultaneous engagement of the pedal lift, pedal lift lock and optionally the handle allows the vertical support structure to move upward to a desired height. The subsequent disengagement of the pedal lift lock then allows the locking spring 112 to decompress, thereby inserting the locking spring pin 113 back into the vertical support structure/central tube and causing the pin to enter one of the plurality of locking pin holes 4B, thereby securing the top frame 5 (not pictured) at the desired height. In a possible arrangement, locking pin holes exist in both the outer sheath of the vertical support structure and the inner central tube, overlaying at certain lift levels and allowing the locking spring pin to be inserted into two such overlaying holes simultaneously. In another arrangement, the locking spring pin inserts directly into a locking pin hole in the central tube. Preferably, the pedal lift lock will allow for setting the elevation of the top frame at preset increments, such as 1" or 2" increments.

In a preferred embodiment, each caster mechanism, the top assembly and the entire device are foldable for ease of storage and transportation.

While the description above describes a device designed for the removal of SUV convertible tops, as there is currently a demand for this type of device, the described device with minor modifications known to those skilled in the art could also be used for removing different types of vehicle tops and doors, including but not limited to removable hardtops for cars, and caps for truck beds.

It would be appreciated by those skilled in the art that various changes and modifications can be made to the illustrated embodiments without departing from the spirit of

LIST OF REFERENCE NUMBERS 0 hardtop removal device
1 removable hardtop
2 convertible SUV
3 wheeled base unit
4 vertical support structure
4A central tube
4B locking pin hole
5 top frame
α slope angle of platform assembly
6 legs
7 casters (wheels)
7A caster joint with locking pin
8 slide-over connections (not pictured)
9 U-shaped frame (bottom component)
10 tires (of SUV)
11 variable height support beams
12 aligning holes, pins
13 hinged/pivoting connections
14 vertical locking pin
20 drip rail (in hardtop)
21 lift lever
30 top clamping assembly
31 spreader bars
32 adjustment bar
33 ball style coupler
34 safety pin
35 clamping members
36 drip rail latch
37 support shelf
65 locking hinge
68 lever seat
69 handle
70 upper portion of vertical support structure
71 lift lever attachments
72 pull stop
100 pedal lift
101 pedal
102 pedal lever
103 pedal lift arm
104 lower lift arm joint
105 upper lift arm joint
106 lift arm hinge
107 lift arm bolt
107A lift arm bolt slot
108 pedal lever hinge
109 pedal lift lock
110 pedal lift lock ring
111 spring plate
112 locking spring
113 locking spring pin The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

I claim:

1. An apparatus for removing, storing, and installing removable hardtop devices from vehicles comprising: a movable base unit to support the apparatus from longitudinal and axial moments with and without the hardtop engaged;
a vertical support structure having a lower and an upper end, wherein said lower end is affixed to said movable base unit and said upper end is attached to a top platform;
a pedal lift connected to each of the vertical support structure and the movable base unit, the pedal lift comprising a pedal lift lock embodied as a wire, locking spring and locking spring pin, whereby the locking spring directly applies pressure to the locking spring pin, pushing the spring pin into one of a plurality of locking pin holes in a central tube or the vertical support structure, thereby locking the apparatus at a set height;
a top clamping assembly comprising one or more spreader bars and an adjustment bar, wherein the adjustment bar is adjustable to set the width of the top clamping assembly, and each spreader bar terminates in a clamping member; and
wherein the apparatus may be positioned to the hardtop on the vehicle and selectively raised or lowered by said pedal lift.

2. The apparatus of claim 1, wherein the apparatus may be positioned to the side or rear of the vehicle to engage the hardtop for removal.

3. The apparatus of claim 1, wherein each clamping member comprises an adjustable drip rail latch which clamps onto a drip rail on a side of the hardtop, with a support shelf clamping underneath such drip rail.

4. The apparatus of claim 1, wherein the top clamping assembly is rotatably attached to the apparatus with a ball style coupler.

5. The apparatus of claim 4, wherein the ball style coupler is lockable with a safety pin.

6. The apparatus of claim 1, wherein the adjustment bar is embodied as a bar that slidably widens and narrows.

7. The apparatus of claim 1, further comprising a lift lever connected to each of the vertical support structure and a lever seat in lieu of the pedal lift.

8. The apparatus of claim 7, wherein the lift lever comprises a locking hinge or is lockable using a pull stop.

9. The apparatus of claim 1, further comprising wherein the top platform assembly is attached via a ball style coupler, wherein an engaged hardtop may be positioned at a desired angle by means of turning the ball style coupler.

10. A method of removing a removable hardtop from a vehicle using the apparatus of claim 1, such apparatus comprising a wheeled base unit, a vertical support structure, a means of vertical lifting and a top clamping assembly, such method comprising the steps of:
a. positioning the movable base unit to the back of the vehicle;
b. positioning the vertical support structure having a lower end and upper end, wherein said lower end is affixed to said movable base and said upper end is attached to a means for vertical lifting;
c. engaging the hardtop by clamping at least two clamping members to drip rails on either side of the hardtop, adjusting the width of such clamping members with an adjustment bar;
d. engaging the means for vertical lifting and thereby exerting vertical force to lift the hardtop from the vehicle, sustain the hardtop at a fixed height, and thereafter allow the hardtop to be controllably lowered onto the vehicle during reinstallation; and e. wheeling the apparatus away from the vehicle.

11. The method of claim 10, further comprising the step:

f. engaging a pull stop or pedal lift lock to set the height of the lifted top frame; and g. storing the removable hardtop on the apparatus over the hood of a SUV by rolling the wheeled base unit beneath and between the front wheels of the SUV.

12. The method of claim 10, wherein the means for vertical lifting is depressing a pedal lift.

13. The method of claim 10, wherein engaging the means for vertical lifting is pulling downward on a lift lever to raise the top clamping assembly and engaging a locking hinge.

14. A method of removing a removable hardtop from a vehicle using the apparatus of claim 1, such apparatus comprising a wheeled base unit, a vertical support structure, a means of vertical lifting and a top clamping assembly, such method comprising the steps of:

a. rotating the top clamping assembly using an attached ball style coupler until the clamping assembly is running directly in line with wheeled base unit;

b. positioning the movable base unit to the side of the vehicle;

c. positioning the vertical support structure having a lower end and upper end, wherein said lower end is affixed to said movable base and said upper end is attached to a means for vertical lifting;

d. engaging the hardtop by clamping at least two clamping members to drip rails on either side of the hardtop, adjusting the width of such clamping members with an adjustment bar;

e. engaging the means for vertical lifting and thereby exerting vertical force to remove the hardtop from the vehicle, sustain the hardtop at a fixed height, and thereafter allow the hardtop to be controllably lowered onto the vehicle during reinstallation; and f. wheeling the apparatus away from the vehicle.

* * * * *